United States Patent
Kuo et al.

(10) Patent No.: US 8,982,296 B2
(45) Date of Patent: Mar. 17, 2015

(54) LIQUID CRYSTAL DISPLAY DEVICE, BACKLIGHT MODULE AND BACK PLATE COMPONENT

(75) Inventors: Yi-cheng Kuo, Guandong (CN); Yu-chun Hsiao, Guandong (CN); Chengwen Que, Guandong (CN); Pangling Zhang, Guandong (CN); Dehua Li, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 3 days.

(21) Appl. No.: 13/641,106

(22) PCT Filed: Aug. 14, 2012

(86) PCT No.: PCT/CN2012/080069
§ 371 (c)(1),
(2), (4) Date: Oct. 13, 2012

(87) PCT Pub. No.: WO2014/023036
PCT Pub. Date: Feb. 13, 2014

(65) Prior Publication Data
US 2014/0043557 A1     Feb. 13, 2014

(30) Foreign Application Priority Data
Aug. 7, 2012   (CN) ........................... 2012 1 0278668

(51) Int. Cl.
*G02F 1/1333*   (2006.01)

(52) U.S. Cl.
CPC ............................. *G02F 1/133308* (2013.01)
USPC ............................................................ 349/58

(58) Field of Classification Search
None
See application file for complete search history.

(56) References Cited

U.S. PATENT DOCUMENTS

2012/0262855 A1\* 10/2012 Park et al. ................ 361/679.01

\* cited by examiner

*Primary Examiner* — Richard Kim
(74) *Attorney, Agent, or Firm* — Andrew C. Cheng

(57) ABSTRACT

The present invention provides a liquid crystal display device, backlight module and back plate component thereof. The backlight module includes optical member, and the back plate element includes first splicing element and second splicing element. First splicing element is disposed with first accommodation trench to accommodate first side of optical member. One end of second splicing element is coupled with one end of first splicing element, and second splicing element is disposed with second accommodation trench to accommodate second side of optical member. Before assembly, first splicing element and second splicing element can rotate around coupled end, and first splicing element can be rotated to inside of second accommodation trench or second splicing element can be rotated to inside of first accommodation trench. The back plate element of the present invention can be folded for transport before assembly to reduce transport cost.

5 Claims, 3 Drawing Sheets

LIQUID CRYSTAL DISPLAY DEVICE, BACKLIGHT MODULE AND BACK PLATE COMPONENT

BACKGROUND OF THE INVENTION

1. Field of the Invention

The present invention relates to the field of liquid crystal displaying techniques, and in particular to a liquid crystal display device, backlight module and back plate component.

2. The Related Arts

Liquid crystal display device is a common device often seen with computers, TV and cell phones. As the technology develops, the functions of liquid crystal display device are increasingly improved. The future of liquid crystal displaying technique is sure to be even more important.

At present, the manufacturing of liquid crystal display device usually is a result of collaboration of many factories. For example, factory A manufactures back plate element, and the back plate element is shipped to factory B for assembling backlight module. After several assembly processes, the final product can be manufactured. For widening applications, in addition to improve functions, the cost of liquid crystal display device must also be reduced. However, in known back plate element technique, the back plate element is usually monolithically formed. When transporting to backlight module assembly factory, each back plate element takes up a large space, which results in higher transport cost and eventually leads to higher overall cost for liquid crystal display device.

SUMMARY OF THE INVENTION

The technical issue to be addressed by the present invention is to provide a liquid crystal display device, backlight module and back plate component to effectively solve the relatively high transport cost in known back plate techniques and reduce the cost.

The present invention provides a liquid crystal display device, which comprises a first splicing element and a second splicing element; the first splicing element comprising first stop wall for supporting liquid crystal panel, and the first splicing element being disposed with a first coupling part and a first accommodation trench of first side for accommodating optical member; the second splicing element comprising a second stop wall for supporting liquid crystal panel, and second splicing element being disposed with a second coupling part and a second accommodation trench of second side for accommodating optical member; the first splicing element and the second splicing element being coupled through the first coupling part and the second coupling part; before assembly, the first splicing element and the second splicing element rotating around coupled end, and the first splicing element rotating to inside of second accommodation trench, or the second splicing element rotating to inside of first accommodation trench.

According to a preferred embodiment of the present invention, the first splicing element further comprises a first bottom plate and a first side wall connecting first bottom plate and first stop wall; the first bottom plate is for supporting the bottom surface of optical member, the first stop wall is for pressing against upper surface of optical member; the first coupling part is first via hole disposed respectively on the first bottom plate and the first stop wall; the second splicing element further comprises a second bottom plate and a second side wall connecting second bottom plate and second stop wall; the second bottom plate is for supporting the bottom surface of optical member, the second stop wall is for pressing against upper surface of optical member; the second coupling part is second via hole disposed respectively on the second bottom plate and the second stop wall; the first splicing element and the second splicing element are coupled through rivet or screw penetrating first via hole and second via hole, and one end of the first side wall adjacent to second side wall or one end of second side wall adjacent to first side wall is disposed with a guiding trench to allow relative rotation between the first splicing element and the second splicing element.

According to a preferred embodiment of the present invention, the first splicing element further comprises a first bottom plate and a first side wall connecting first bottom plate and first stop wall; the first bottom plate is for supporting the bottom surface of optical member, the first stop wall is for pressing against upper surface of optical member; the first coupling part is via hole disposed respectively on the first bottom plate and the first stop wall; the second splicing element further comprises a second bottom plate and a second side wall connecting second bottom plate and second stop wall; the second bottom plate is for supporting the bottom surface of optical member, the second stop wall is for pressing against upper surface of optical member; the second coupling part is protruding block disposed respectively on the second bottom plate and the second stop wall; the first splicing element and the second splicing element are coupled through matching via hole and protruding block, and one end of the first side wall adjacent to second side wall or one end of second side wall adjacent to first side wall is disposed with a guiding trench to allow relative rotation between the first splicing element and the second splicing element.

According to a preferred embodiment of the present invention, the first splicing element further comprises a first bottom plate and a first side wall connecting first bottom plate and first stop wall; the first bottom plate is for supporting the bottom surface of optical member, the first stop wall is for pressing against upper surface of optical member; the first coupling part is protruding block disposed respectively on the first bottom plate and the first stop wall; the second splicing element further comprises a second bottom plate and a second side wall connecting second bottom plate and second stop wall; the second bottom plate is for supporting the bottom surface of optical member, the second stop wall is for pressing against upper surface of optical member; the second coupling part is via hole disposed respectively on the second bottom plate and the second stop wall; the first splicing element and the second splicing element are coupled through matching protruding block and via hole, and one end of the first side wall adjacent to second side wall or one end of second side wall adjacent to first side wall is disposed with a guiding trench to allow relative rotation between the first splicing element and the second splicing element.

The present invention provides a back plate element of backlight module, the backlight module comprising optical member and back plate element, the back plate element comprising a first splicing element and a second splicing element; the first splicing element being disposed with a first coupling part and a first accommodation trench of first side for accommodating optical member; one end of the second splicing element being coupled to one end of the first splicing element; the second splicing element being disposed with a second coupling part and a second accommodation trench of second side for accommodating optical member; the first splicing element and the second splicing element being coupled through the first coupling part and the second coupling part; before assembly, the first splicing element and the second splicing element rotating around coupled end, and the first splicing element rotating to inside of second accommodation trench, or the second splicing element rotating to inside of first accommodation trench.

According to a preferred embodiment of the present invention, the first splicing element further comprises a first bottom plate and a first stop wall; the first bottom plate is for supporting the bottom surface of optical member, the first stop wall is for pressing against upper surface of optical member; the first coupling part is first via hole disposed respectively on the first bottom plate and the first stop wall; the second splicing element further comprises a second bottom plate and a second stop wall; the second bottom plate is for supporting the bottom surface of optical member, the second stop wall is for pressing against upper surface of optical member; the second coupling part is second via hole disposed respectively on the second bottom plate and the second stop wall; the first splicing element and the second splicing element are coupled through rivet or screw penetrating first via hole and second via hole.

According to a preferred embodiment of the present invention, the first splicing element further comprises a first side wall connecting first bottom plate and first stop wall; the second splicing element further comprises a second side wall connecting second bottom plate and second stop wall; and one end of the first side wall adjacent to second side wall and/or one end of second side wall adjacent to first side wall is disposed with a guiding trench to allow relative rotation between the first splicing element and the second splicing element.

According to a preferred embodiment of the present invention, the first bottom plate and the first stop wall are disposed between the second bottom plate and the second stop wall, or the second bottom plate and the second stop wall are disposed between the first bottom plate and the first stop wall.

According to a preferred embodiment of the present invention, the first splicing element further comprises a first bottom plate and a first stop wall; the first bottom plate is for supporting the bottom surface of optical member, the first stop wall is for pressing against upper surface of optical member; the first coupling part is via hole disposed respectively on the first bottom plate and the first stop wall; the second splicing element further comprises a second bottom plate and a second stop wall; the second bottom plate is for supporting the bottom surface of optical member, the second stop wall is for pressing against upper surface of optical member; the second coupling part is protruding block disposed respectively on the second bottom plate and the second stop wall; the first splicing element and the second splicing element are coupled through matching via hole and protruding block.

According to a preferred embodiment of the present invention, the first splicing element further comprises a first side wall connecting first bottom plate and first stop wall; the second splicing element further comprises a second side wall connecting second bottom plate and second stop wall; and one end of the first side wall adjacent to second side wall and/or one end of second side wall adjacent to first side wall is disposed with a guiding trench to allow relative rotation between the first splicing element and the second splicing element.

According to a preferred embodiment of the present invention, the first bottom plate and the first stop wall are disposed between the second bottom plate and the second stop wall, or the second bottom plate and the second stop wall are disposed between the first bottom plate and the first stop wall.

According to a preferred embodiment of the present invention, the first splicing element further comprises a first bottom plate and a first stop wall; the first bottom plate is for supporting the bottom surface of optical member, the first stop wall is for pressing against upper surface of optical member; the first coupling part is protruding block disposed respectively on the first bottom plate and the first stop wall; the second splicing element further comprises a second bottom plate and a second stop wall; the second bottom plate is for supporting the bottom surface of optical member, the second stop wall is for pressing against upper surface of optical member; the second coupling part is via hole disposed respectively on the second bottom plate and the second stop wall; the first splicing element and the second splicing element are coupled through matching protruding block and via hole.

According to a preferred embodiment of the present invention, the first splicing element further comprises a first side wall connecting first bottom plate and first stop wall; the second splicing element further comprises a second side wall connecting second bottom plate and second stop wall; and one end of the first side wall adjacent to second side wall and/or one end of second side wall adjacent to first side wall is disposed with a guiding trench to allow relative rotation between the first splicing element and the second splicing element.

According to a preferred embodiment of the present invention, the first bottom plate and the first stop wall are disposed between the second bottom plate and the second stop wall, or the second bottom plate and the second stop wall are disposed between the first bottom plate and the first stop wall.

According to a preferred embodiment of the present invention, the number of first splicing elements and the number of second splicing elements are both two.

The present invention provides a backlight module, which comprises optical member and back plate element, wherein the back plate element comprising a first splicing element and a second splicing element; the first splicing element being disposed with a first coupling part and a first accommodation trench of first side for accommodating optical member; second splicing element being disposed with a second coupling part and a second accommodation trench of second side for accommodating optical member; the first splicing element and the second splicing element being coupled through the first coupling part and the second coupling part; before assembly, the first splicing element and the second splicing element rotating around coupled end, and the first splicing element rotating to inside of second accommodation trench, or the second splicing element rotating to inside of first accommodation trench.

According to a preferred embodiment of the present invention, the first splicing element further comprises a first bottom plate, a first stop wall and a first side wall connecting first bottom plate and first stop wall; the first bottom plate is for supporting the bottom surface of optical member, the first stop wall is for pressing against upper surface of optical member; the first coupling part is first via hole disposed respectively on the first bottom plate and the first stop wall; the second splicing element further comprises a second bottom plate, a second stop wall and a second side wall connecting second bottom plate and second stop wall; the second bottom plate is for supporting the bottom surface of optical member, the second stop wall is for pressing against upper surface of optical member; the second coupling part is second via hole disposed respectively on the second bottom plate and the second stop wall; the first splicing element and the second splicing element are coupled through rivet or screw penetrating first via hole and second via hole, and one end of the first side wall adjacent to second side wall and/or one end of second side wall adjacent to first side wall is disposed with a guiding trench to allow relative rotation between the first splicing element and the second splicing element.

According to a preferred embodiment of the present invention, the first splicing element further comprises a first bottom plate, a first stop wall and a first side wall connecting first bottom plate and first stop wall; the first bottom plate is for supporting the bottom surface of optical member, the first stop wall is for pressing against upper surface of optical member; the first coupling part is via hole disposed respectively on the first bottom plate and the first stop wall; the second splicing element further comprises a second bottom plate, a second stop wall and a second side wall connecting second bottom plate and second stop wall; the second bottom plate is for supporting the bottom surface of optical member, the second stop wall is for pressing against upper surface of optical member; the second coupling part is protruding block disposed respectively on the second bottom plate and the second stop wall; the first splicing element and the second splicing element are coupled through matching via hole and protruding, and one end of the first side wall adjacent to second side wall and/or one end of second side wall adjacent to first side wall is disposed with a guiding trench to allow relative rotation between the first splicing element and the second splicing element.

According to a preferred embodiment of the present invention, the first splicing element further comprises a first bottom plate, a first stop wall and a first side wall connecting first bottom plate and first stop wall; the first bottom plate is for supporting the bottom surface of optical member, the first stop wall is for pressing against upper surface of optical member; the first coupling part is protruding block disposed respectively on the first bottom plate and the first stop wall; the second splicing element further comprises a second bottom plate, a second stop wall and a second side wall connecting second bottom plate and second stop wall; the second bottom plate is for supporting the bottom surface of optical member, the second stop wall is for pressing against upper surface of optical member; the second coupling part is via hole disposed respectively on the second bottom plate and the second stop wall; the first splicing element and the second splicing element are coupled through matching protruding block and via hole, and one end of the first side wall adjacent to second side wall and/or one end of second side wall adjacent to first side wall is disposed with a guiding trench to allow relative rotation between the first splicing element and the second splicing element.

The efficacy of the present invention is that to be distinguished from the state of the art. Through disposing coupling parts between different splicing elements, the present invention realizes the foldable back plate element. Before assembly, the back plate element can be folded for transport to reduce space so as to reduce transport volume, improve transport efficiency and reduce transport cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
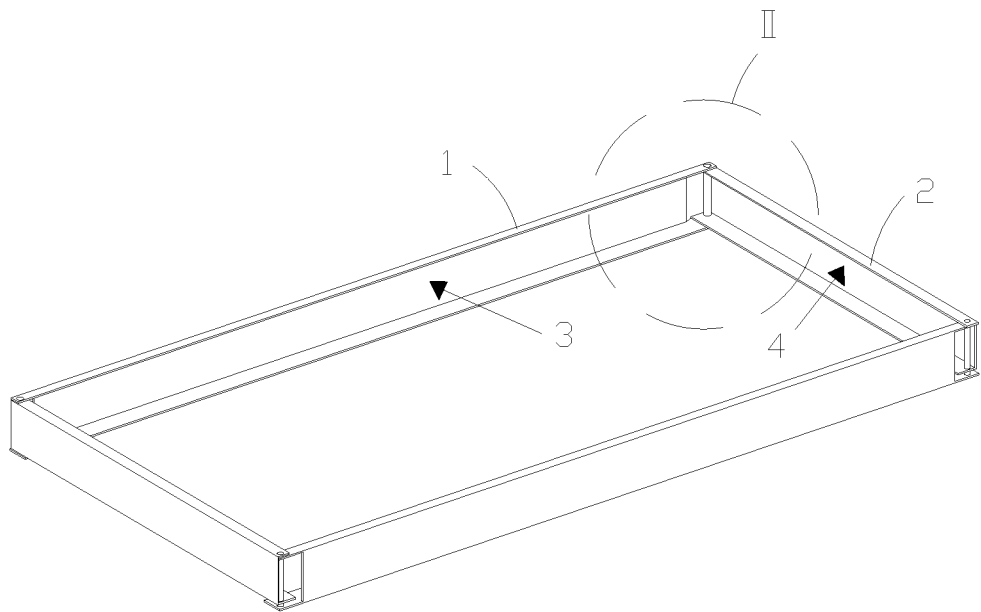
FIG. 1 is a schematic view showing the structure of a back plate element of the first embodiment of the present invention.

The following provides a clear and complete description of the technical solution according to the present invention using the drawing and the embodiment. Apparently, the drawings described below show only example embodiments of the present invention, instead of all embodiments. For other embodiments based on the disclosed drawings and embodiments, and obtained by those having ordinary skills in the art without paying any creative effort are also within the scope of the present invention.

Figure 2:
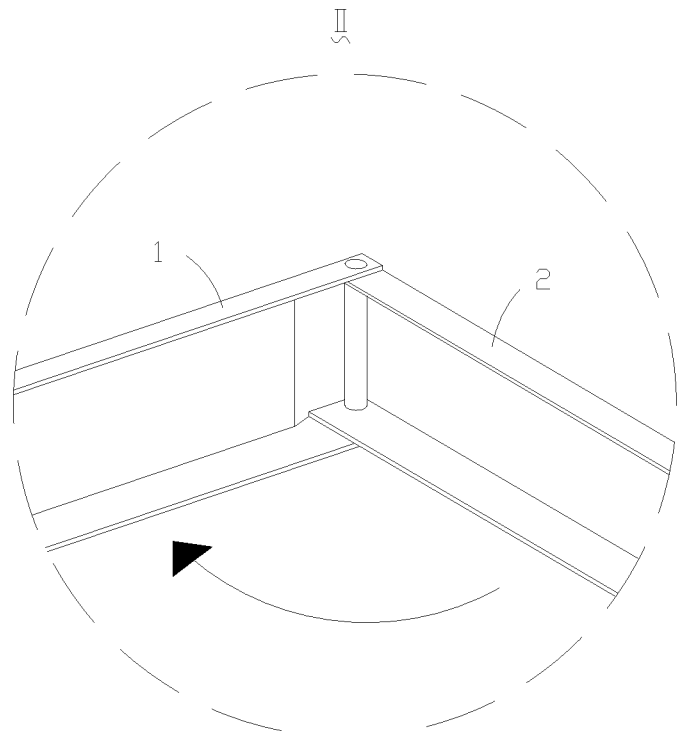
FIG. 2 is an enlarge view showing the structure of the II part of the back plate element shown in FIG. 1.

The first embodiment refers to FIG. 1 and FIG. 2. The instant embodiment provides a back plate element of backlight module. The backlight module comprises optical member and back plate element, and the back plate element further comprises first splicing element 1 and second splicing element 2. It should be understood that optical member and back plate element are the main elements, but not the complete elements, of the backlight module of the instant embodiment. In other embodiments, the elements of the backlight module can vary according to requirements. No specific restriction is imposed by the present invention. The following describes the specific structure of the back plate element.

Specifically, first splicing element 1 is disposed with first accommodation trench 3, second splicing element 2 is disposed with second accommodation trench 4, and first accommodation trench 3 and second accommodation trench 4 are for accommodating two adjacent sides of optical member respectively. Because optical member is usually of a plate structure, first accommodation trench 3 and second accommodation trench 4 can be shaped as U to accommodate optical member. Because optical member is of known technique, detailed description is omitted here.

The following describes the connection of first splicing element 1 and second splicing element 2. In the instant embodiment, the two are coupled, that is, one end of first splicing element 1 is coupled to one end of second splicing element 2, and the two can rotate around the coupled end. As such, first splicing element 1 can be rotated to inside of second accommodation trench 4, or second splicing element 2 can be rotated to inside of second accommodation trench 3. Therefore, when transported before assembly, first splicing element 1 and second splicing element 2 can be folded to reduce space occupied by each back plate element so as to reduce the volume as well as transport cost and improve transport efficiency.

The first embodiment of the present invention, through coupling first splicing element 1 and second splicing element 2, can reduce transport volume by folding the two together to improve efficiency and reduce cost.

Figure 3:
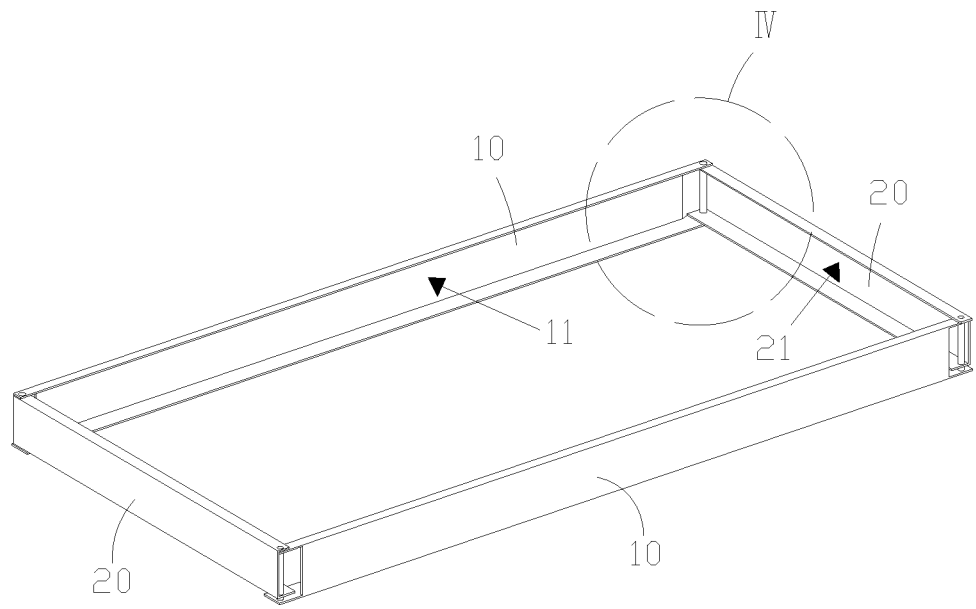
FIG. 3 is a schematic view showing the structure of a back plate element of the second embodiment of the present invention.
Figure 4:
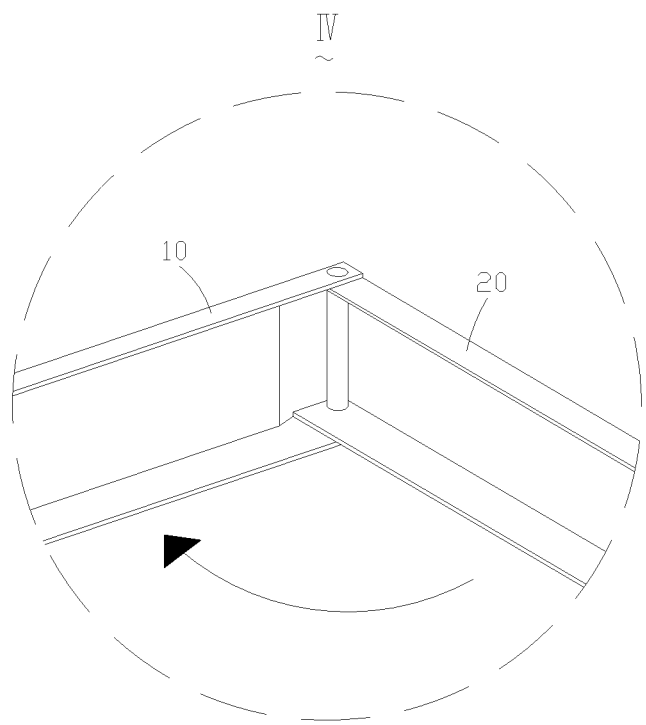
FIG. 4 is an enlarge view showing the structure of the IV part of the back plate element shown in FIG. 3.

The second embodiment refers to FIG. 3 and FIG. 4. In the instant embodiment, the backlight module comprises, but is not limited to, optical member and back plate element, wherein the optical member can use optical member of known technique, and no specific restriction is imposed by the present invention. The following describes the specific structure of the back plate element.

In the instant embodiment, back plate element comprises two first splicing element 10 and two second splicing element 20, and the four splicing elements are connected in head-to-tail manner to form a complete back plate element. It should be understood that in other embodiments, other numbers of splicing elements, for example, six first splicing element 10 and four second splicing element 20, can also be used to connected in head-to-tail manner to form a complete back plate element as long as the shape and size of the complete back plate element match the optical member. The present invention imposes no specific restriction on the number of splicing elements. The instant embodiment only uses two first splicing element 10 and two second splicing element 20 for illustrative purpose.

Figure 5:
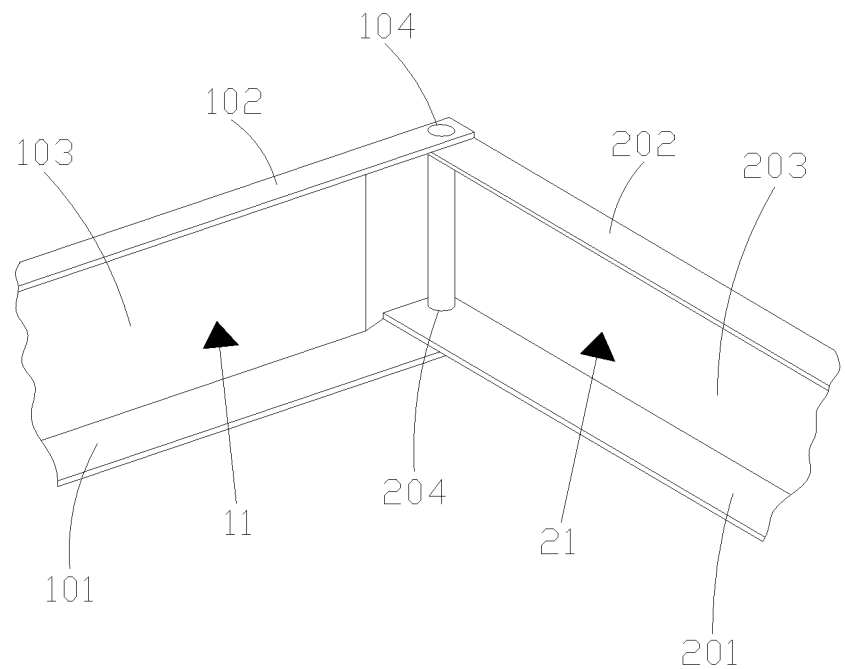
FIG. 5 is a schematic view showing the structure of the back plate element shown in FIG. 4.

The specific structure of first splicing element 10 and second splicing element 20 is described as follows. Referring to FIG. 5, first splicing element 10 comprises first bottom plate 101, first stop wall 102, first side wall 103 and first coupling part 104, wherein first bottom plate 101 contacts bottom surface of optical member to support optical member; first stop wall 102 contacts upper surface of optical member to press optical member. First side wall 103 is for connecting first bottom plate 101 and first stop wall 102. Specifically, bottom end of first side wall 103 is connected to first bottom plate 101, top end of first side wall 103 is connected to first stop wall 102; first coupling part 104 is first via hole (now shown) disposed respectively on first bottom plate 101 and first stop wall 102.

It can be seen that first bottom plate 101, first stop wall 102 and first side wall 103 form first accommodation trench 11, and the accommodation trench is to accommodate a first side of optical member. Those with ordinary skills in the related field can easily understand that first accommodation trench 11 has the function of accommodating and positioning optical member.

The basic structure of second splicing element 20 is similar to the structure of first splicing element 10. Specifically, second splicing element 20 comprises second bottom plate 201, second stop wall 202, second side wall 203 and second coupling part 204, wherein second bottom plate 201 is for supporting bottom surface of optical member, second stop wall 202 is for contacting upper surface of optical member, and second side wall 203 is for connecting second bottom plate 201 and second stop wall 202. Second coupling part 204 is second via hole (not shown) disposed respectively on second bottom plate 201 and second stop wall 202.

In the instant embodiment, second bottom plate 201, second stop wall 202 and second side wall 203 form second accommodation trench 21, and the accommodation trench is for accommodating a second side (i.e., a side of optical member adjacent to the aforementioned first side) of optical member. Second accommodation trench 21 also provides the function of accommodating and positioning optical member, and second accommodation trench 21 and first accommodation trench 11 match each other to accommodate and fix adjacent sides of optical member respectively. For realizing the function of accommodating and positioning optical member, first accommodation trench 11 and second accommodation trench 21 can be shaped as U.

It should be noted that the specific structure of first bottom plate 101, first stop wall 102, first side wall 103, second bottom plate 201, second stop wall 202 and second side wall 203 can all varied flexibly. Take first side wall 103 as an example. In the instant embodiment, first side wall 103 is a side plate monolithically formed. Obviously, in other embodiments, first side wall 103 can also be standing columns disposed with intervals and two ends of each standing column are connected to first bottom plate 101 and first stop wall 102 respectively. Take second stop wall 202 as another example. The function of second stop wall 202 is to contact and press against the upper surface of optical member. It should ne understood that the specific shape of second stop wall 202 can be rectangular, triangular, arc or even stripes disposed with interval. Therefore, without affecting the functionality, the present invention does not impose any specific restriction on the size and shape of any bottom plate, stop wall or side wall.

After describing the structures of first splicing element 10 and second splicing element 20, the following describes the connection of the two. First splicing element 10 and second splicing element 20 are connected through coupling, that is, one end of first splicing element 10 is coupled to one end of second splicing element 20 through coupling first coupling part 104 and second coupling part 204. In the instant embodiment, through rivet or screw penetrating first via hole and second via hole, the coupling is realized. Because using rivet or screw penetrating first via hole and second via hole is widely known to the technical field, the detailed description is omitted.

It should be noted that the shape, size and other characteristics of first via hole and second via hole can vary accordingly for actual application and the connection is not limited to rivet or screw as long as. For example, if the shape of first via hole and second via hole is square, a square positioning column can be inserted to interface. The only requirement is that first splicing element 10 and second splicing element 20 can be folded and can be rotate to form 90° angle. Similarly, during manufacturing, a plurality of via holes can be disposed on stop wall and bottom plate so that the operator can select the most suitable via hole for coupling. The present invention imposes no specific restriction here.

Figure 6:
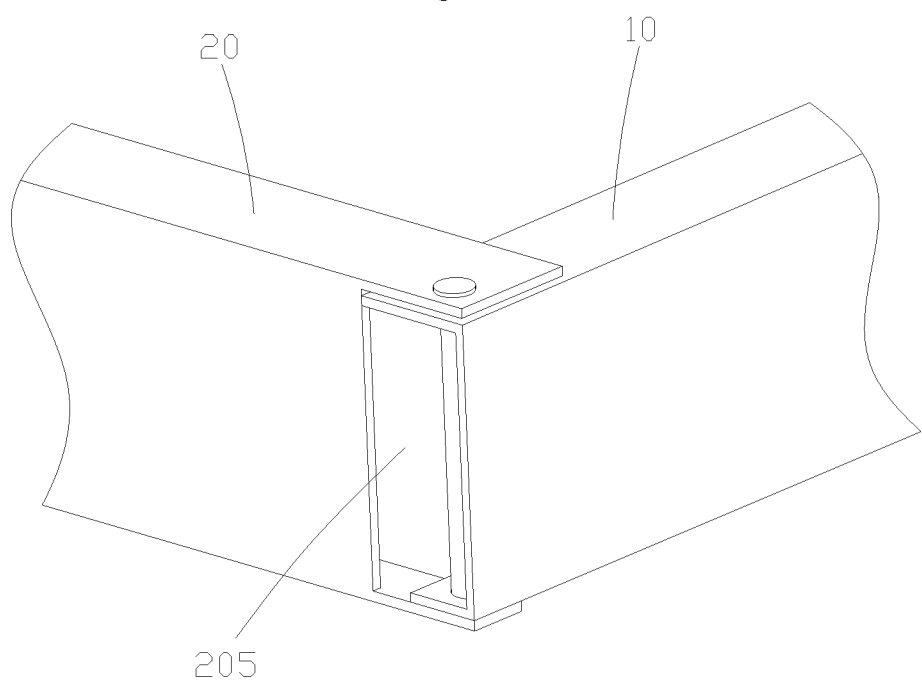
FIG. 6 is a schematic view showing another partial structure of the back plate element shown in FIG. 3.

Refer to FIG. 6. First side wall 103 and/or second side wall 203 are disposed with guiding trench 205 at location close to the coupled end to facilitate convenient relative rotation between first splicing element 10 and second splicing element 20. Guiding trench 205 is a hollow space reserved on side wall of splicing element to allow the coupling part of another splicing element to rotate freely following a default trajectory. It should be noted that the specific structure of guiding trench 205 can vary accordingly for actual application. The present invention imposes no specific restriction on the structure and other features of guiding trench 205.

It should be noted that first coupling part 104 and second coupling part 204 are not limited to the above disposition. For example, first coupling part 104 is disposed as via hole on first bottom plate 101 and first stop wall 102 respectively, and second coupling part 204 is disposed as protruding block on second bottom plate 201 and second stop wall 202 respectively so that first splicing element 10 and second splicing element 20 can be coupled through matching via holes and protruding blocks. Alternatively, first coupling part 104 is disposed as protruding block on first bottom plate 101 and first stop wall 102 respectively, and second coupling part 204 is disposed as via hole on second bottom plate 201 and second stop wall 202 respectively so that first splicing element 10 and second splicing element 20 can be coupled through matching protruding blocks and via holes. In addition, first coupling part 104 is disposed as positioning column on first bottom plate 101 (or first stop wall 102), second coupling part 204 is disposed as accommodation trench on second bottom plate 201 (or second stop wall 202), and the coupling can be realized through matching positioning column and accommodation trench. As long as coupling can be realized, the present invention imposes no specific restriction on first coupling part 104 and second coupling part 204.

As shown in FIG. 4, when transporting before assembly, second splicing element 20 can be rotated to inside of first accommodation trench 11. As such, second bottom plate 201 and second stop wall 202 can be disposed between first bottom plate 101 and first stop wall 102. It should be understood that other folding manner can also be used. For example, first splicing element 10 can be rotated to inside of second accommodation trench 21. As such, first bottom plate 101 and first stop wall 102 can be disposed between second bottom plate 201 and second stop wall 202. Alternatively, an interlaced folding manner can be used, such as, disposing first bottom plate 101 and second stop wall 202 between second bottom plate 201 and first stop wall 102. For other embodiments based on the disclosed drawings and embodiments, and obtained by those having ordinary skills in the art without paying any creative effort are also within the scope of the present invention.

In the second embodiment of the present invention, first splicing element 10 and second splicing element 20 are coupled so that the back plate element can be folded for transport before assembly so as to reduce transport volume and cost as well as improve transport efficiency.

The third embodiment of the present invention provides a backlight module. The backlight module comprises an optical member and aforementioned back plate element, wherein the optical member comprises stacked light-guiding plate and optical film. Because the specific structure of the back plate element is described as above, the description will not be repeated here.

The fourth embodiment of the present invention provides a liquid crystal display device. The liquid crystal display device comprises a liquid crystal panel and the aforementioned backlight module. Because the specific structures of the backlight module and the back plate element are described as above, the description will not be repeated here.

It is understood that for both backlight module and liquid crystal display device, because the back plate element of the first or the second embodiments of the present invention is used, the back plate element can be folded before assembly for transport to reduce transport volume and cost.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A liquid crystal display device, which comprises a liquid crystal panel, an optical member and back plate elements, the back plate element comprising:
   a first splicing element comprising first stop wall for supporting liquid crystal panel, and a first coupling part and a first accommodation trench of first side for accommodating optical member, the first bottom plate and the first stop wall being interconnected with a first bottom plate and a first side wall, wherein the first bottom plate is used for supporting a bottom surface of the optical member, and the first stop wall is used for pressing against an upper surface of the optical member, the first coupling part is a first via hole disposed respectively on the first bottom plate and the first stop wall;
   a second splicing element comprising a second stop wall for supporting liquid crystal panel, and a second coupling part and a second accommodation trench of second side for accommodating optical member, wherein the first splicing element and the second splicing element are coupled through the first coupling part and the second coupling part, the second bottom plate and the second stop wall being interconnected with a second bottom plate and a second side wall, wherein the second bottom plate is used for supporting the bottom surface of the optical member, the second stop wall is used for pressing against the upper surface of the optical member, wherein the second coupling part is a second via hole disposed respectively on the second bottom plate and the second stop wall; and
   wherein before assembly, the first splicing element and the second splicing element are rotated around coupled end, and the first splicing element rotates to inside of second accommodation trench, or the second splicing element rotates to inside of first accommodation trench; wherein the first splicing element and the second splicing element are coupled through an interengagement, such as a rivet or a screw penetrating through the first via hole and the second via hole, and one end of the first side wall adjacent to second side wall and/or one end of second side wall adjacent to first side wall being disposed with a guiding trench to allow relative rotation between the first splicing element and the second splicing element.

2. A back plate element of backlight module, the backlight module comprising optical member and back plate element, the back plate element comprising:
   a first splicing element having a first coupling part and a first accommodation trench of first side for accommodating optical member, and comprising a first bottom plate and a first stop wall, the first bottom plate being used for supporting a bottom surface of an optical member, and the first stop wall being used for pressing against an upper surface of the optical member, the first coupling part being a first via hole disposed respectively on the first bottom plate and the first stop wall;
   a second splicing element having a second coupling part and a second accommodation trench of second side for accommodating optical member, the first splicing element and the second splicing element being coupled through the first coupling part and the second coupling part, and comprising a second bottom plate and a second stop wall, the second bottom plate being used for supporting the bottom surface of the optical member, the second stop wall being used for pressing against the upper surface of the optical member, the second coupling part being a second via hole disposed respectively on the second bottom plate and the second stop wall;
   wherein before assembly, the first splicing element and the second splicing element rotate around coupled end, and the first splicing element rotates to inside of the second accommodation trench, or the second splicing element rotates to inside of first accommodation trench; wherein the first splicing element and the second splicing element are coupled through an interengagement, such as a rivet or a screw penetrating through the first via hole and the second via hole.

3. The back plate element as claimed in claim 2, characterized in that the first splicing element further comprises a first side wall connecting the first bottom plate and the first stop wall, the second splicing element further comprises a second side wall connecting the second bottom plate and the second stop wall, and one end of the first side wall adjacent to the second side wall and/or one end of the second side wall adjacent to the first side wall is disposed with a guiding trench to allow relative rotation between the first splicing element and the second splicing element.

4. The back plate element as claimed in claim 2, characterized in that the first bottom plate and the first stop wall are disposed between the second bottom plate and the second stop wall, or the second bottom plate and the second stop wall are disposed between the first bottom plate and the first stop wall.

5. A backlight module, which comprises an optical member and a back plate element, the back plate element further comprising:
   a first splicing element being disposed with a first coupling part and a first accommodation trench of first side for accommodating the optical member, the first splicing element further comprising a first bottom plate, a first stop wall and a first side wall connecting the first bottom plate and the first stop wall, the first bottom plate being used for supporting a bottom surface of the optical member, the first stop wall being used for pressing against an upper surface of the optical member, the first coupling part being a first via hole disposed respectively on the first bottom plate and the first stop wall;
   a second splicing element being disposed with a second coupling part and a second accommodation trench of second side for accommodating the optical member, the first splicing element and the second splicing element being coupled through the first coupling part and the second coupling part, the second splicing element further comprising a second bottom plate, a second stop wall and a second side wall connecting the second bottom plate and the second stop wall, the second bottom plate being used for supporting the bottom surface of the optical member, the second stop wall being used for pressing against the upper surface of the optical member, the second coupling part being a second via hole disposed respectively on the second bottom plate and the second stop wall;
   wherein before assembly, the first splicing element and the second splicing element rotates around coupled end, and the first splicing element rotates to inside of the second accommodation trench, or the second splicing element rotates to inside of the first accommodation trench, wherein the first splicing element and the second splicing element are coupled through an interengagement, such as a rivet or a screw penetrating the first via hole and the second via hole, and one end of the first side wall adjacent to the second side wall and/or one end of the second side wall adjacent to the first side wall is disposed with a guiding trench to allow relative rotation between the first splicing element and the second splicing element.

\* \* \* \* \*